United States Patent [19]

Deegener et al.

[11] Patent Number: 4,685,739
[45] Date of Patent: Aug. 11, 1987

[54] UPHOLSTERY SUPPORT FOR THE BACK REST OF A VEHICLE SEAT

[75] Inventors: Elmar Deegener, Kaiserslautern; Hans W. Voss; Günter Franzmann, both of Rockenhausen, all of Fed. Rep. of Germany

[73] Assignee: Keiper Recaro GmbH & Co., Fed. Rep. of Germany

[21] Appl. No.: 873,626

[22] Filed: Jun. 11, 1986

[30] Foreign Application Priority Data

Jun. 14, 1985 [DE]  Fed. Rep. of Germany ....... 3521402

[51] Int. Cl.[4] .............................................. B60N 1/00
[52] U.S. Cl. .................................. 297/452; 297/460; 297/DIG. 2
[58] Field of Search ................ 297/452, 460, DIG. 2, 297/440

[56] References Cited

U.S. PATENT DOCUMENTS

| | | | |
|---|---|---|---|
| 3,627,378 | 12/1971 | Brock | 297/DIG. 2 |
| 3,663,057 | 5/1972 | Lohr et al. | 297/DIG. 2 |
| 3,697,133 | 10/1972 | Wolofski | 297/452 X |
| 4,530,541 | 7/1985 | Resag et al. | 297/452 |
| 4,544,204 | 10/1985 | Schmale | 297/452 |
| 4,556,254 | 12/1985 | Roberts | 297/452 X |
| 4,602,819 | 7/1986 | Morel | 297/452 X |

FOREIGN PATENT DOCUMENTS 3136651  3/1983  Fed. Rep. of Germany ...... 297/452

*Primary Examiner*—Peter A. Aschenbrenner
*Attorney, Agent, or Firm*—Wigman & Cohen

[57] ABSTRACT

An upholstery support for the back rest of a vehicle seat, particularly a motor vehicle seat, has two reinforced half-shells connected with each other along a portion of their edges. The half-shells form hollow box-like arms which distance themselves from each other from a hollow box-like joining area toward their free ends. The free ends of both arms form the lower end of the upholstery support, which has a V-like shape that is open toward the lower end.

22 Claims, 8 Drawing Figures

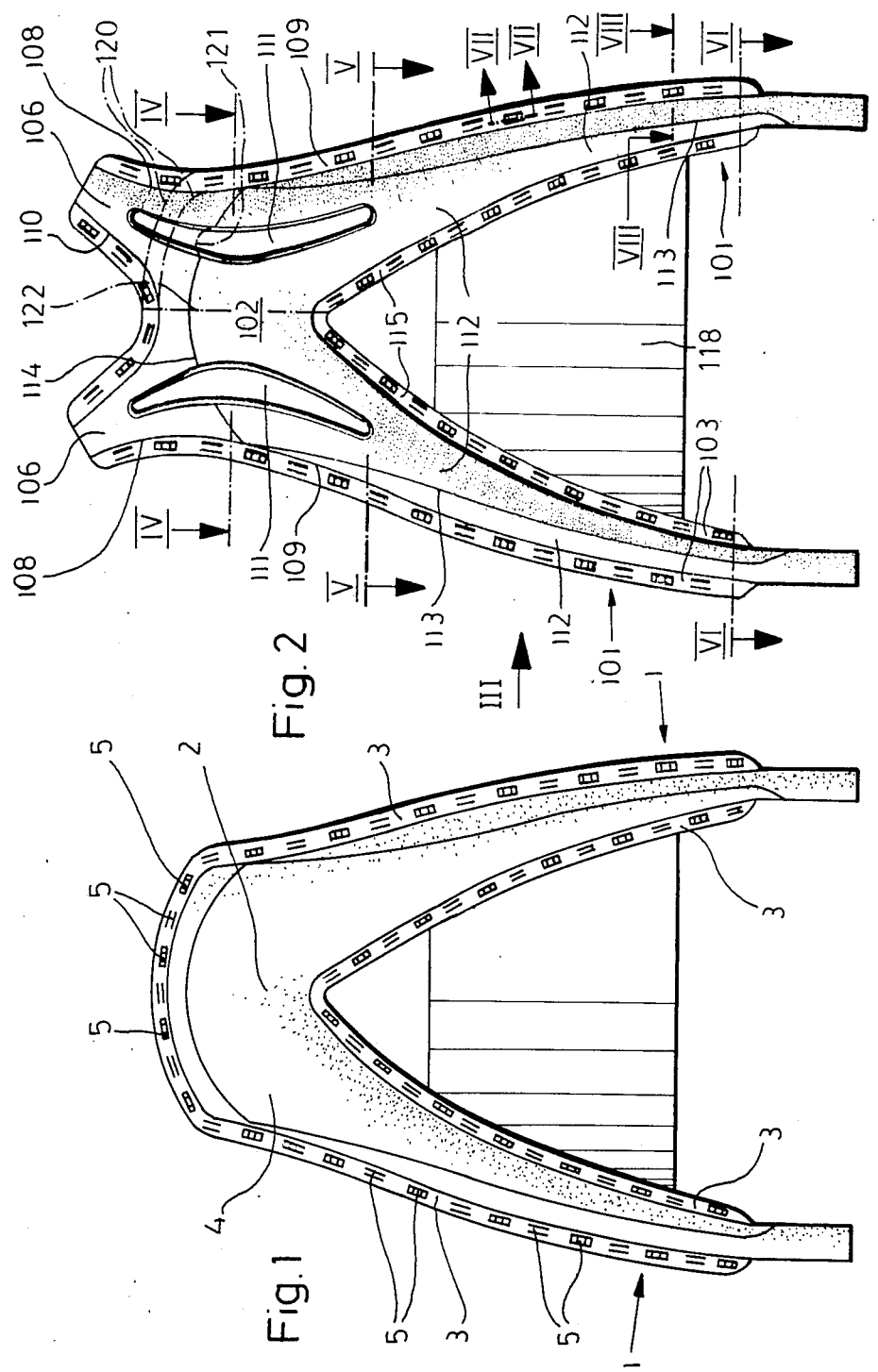

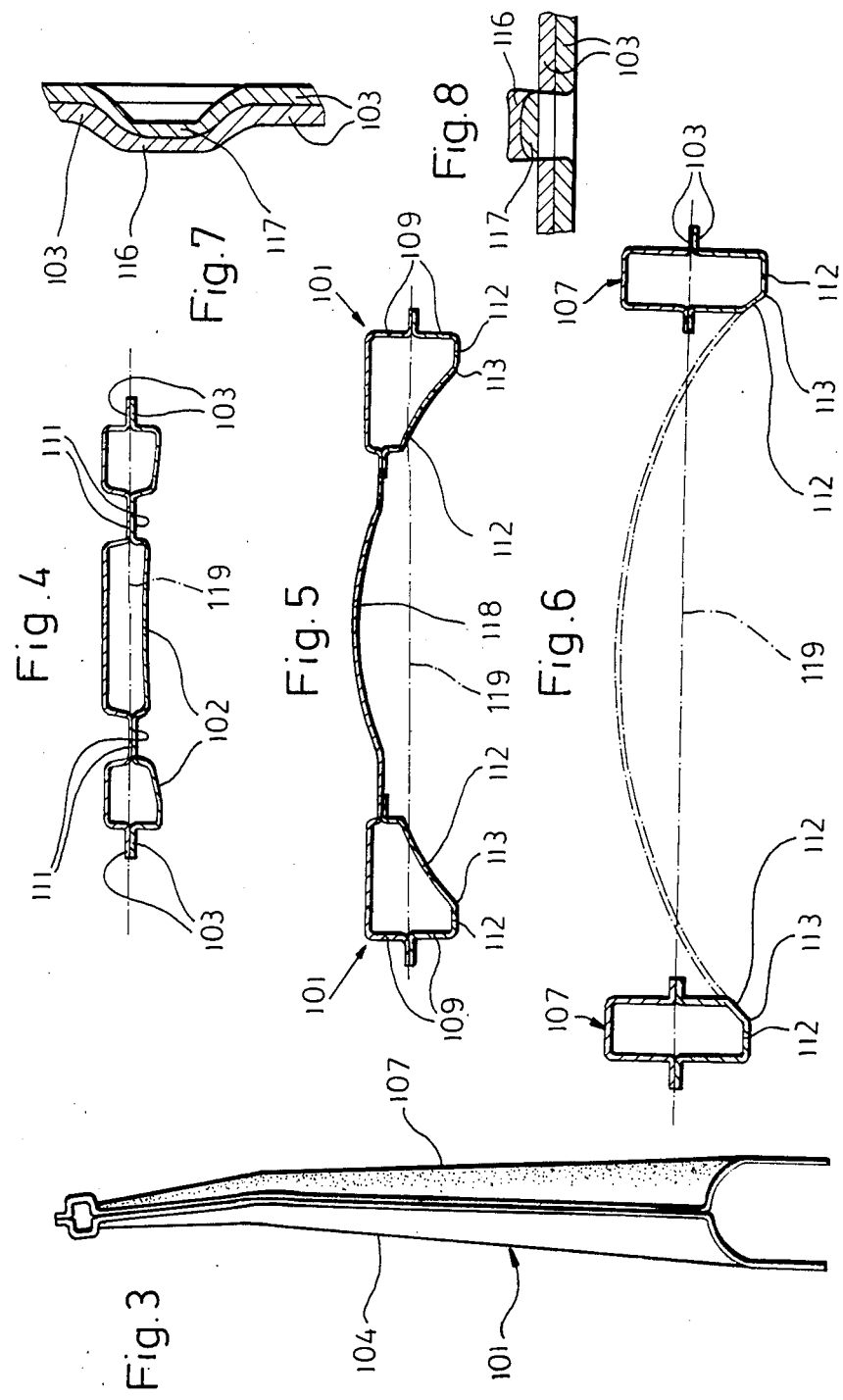

UPHOLSTERY SUPPORT FOR THE BACK REST OF A VEHICLE SEAT

BACKGROUND OF THE INVENTION

The invention relates to an upholstery support for the back rest of a vehicle seat, particularly of a motor vehicle seat, of the type having two reinforced half-shells which are connected with each other to form hollow, box-like arms.

Usually, upholstery supports for vehicle seats are formed as a shell made of metal or plastic, or they have a rectangular frame to which a flat bracket or similar support elements are connected.

In a known air passenger row seat of the above-described type (German Offengleggschrift No. 19 00 979) the upholstery support of the back rest has a double-T-shaped support formed from two half-shells, which is formed symmetrically relative both to its longitudinal axis and to its lateral axis, and is either rigidly connected with the side beams of a rectangular frame or itself forms the upholstery support of the back rest. Due to the hollow box-like design of this support, as well as to swaging and punch-outs in the web areas, this support does indeed have a favorable relationship of stiffness to weight. However, without the outer frame, additional support elements are necessary for an adequate upholstery support in the area between the two cross elements, which increases not only the weight, but also the expense. Above all, as with other known upholstery supports, the torsional resistance under a lateral application of force is inadequate, at least if the upholstery support is not made larger than necessary for a central application of force.

SUMMARY OF THE INVENTION

The object of the invention is to create an upholstery for the back rest of a vehicle seat, which offers the greatest possible safety under a given weight in case of a crash, and particularly when force is applied off-center. This object is achieved by an upholstery support having two reinforced half-shells which are connected with each other at least along a portion of their edges, and which form hollow, box-like arms. The arms separate from each other beginning in a hollow, box-like joining area, extending away from the joining area, and terminating at their free ends. The free ends of the two arms form the lower end of the upholstery support, which has a V-like shape that is open at the lower end.

The V-shaped, downwardly open form of the upholstery support provides a largely equal load on the two arms, even under an off-center application of force, which, in addition to the hollow box design of both the arms and the joining portion, is a significant requirement for an optimal relationship between weight and load-carrying capacity. Through appropriately dimensioning the two arms, the V-shape of the upholstery support also achieves a conversion of energy into a permanent extension of the tensilely loaded surface areas without the compressively loaded surface areas being uncontrollably deformed, which further increases the protection provided by the upholstery support in a crash. An additional significant advantage is that as a result of the V-shape, a better contact can be achieved between the seat user and the upholstery support in the entire area of the upper body, which leads to the seat user being subjected to a significantly smaller load in case of a crash.

An optimal relationship between weight and stiffness, as well as buckling resistance in the arms is achieved with appropriate dimensioning of the width and depth of the arms.

In one preferred embodiment the angle enclosed by the two arms becomes smaller toward their free ends, i.e., the arms are curved. This provides a better contact with the seat user than would be the case with straight arms. In addition, a forward bend can be provided in the upper portion of the upholstery support for profile adaptation. This profile adaptation, however, can also be accomplished by means of the upholstery body or additional elements.

In one preferred embodiment the front side of both arms is provided with a buckle line extending from the free ends of the arms up to the joining area. From the joining area to the outer side the front side has a constant distance to the separation surface and a decreasing distance to the inner edge. A buckle line of this type significantly improves the buckling resistance and thereby reduces the need for swaging. Furthermore, a buckle line of this type permits one to design the front side of the arms without difficulty in such a manner that the upholstery support forms a profiled support surface properly adapted to the human body, which is important for the contact between the seat user and the upholstery support as well as for proper force transfer. Preferably, the buckle line of the two arms ends in the area of the outer edge.

As in the two arms, a buckle line is preferably also provided in the joining area, even if as a rule it is advantageous to provide the front side and the back side of the joining area with swaging, extending as needed into the arms.

The joining area preferably lies at shoulder height. Since in this position the arms have a relatively long length, it is advantageous to arrange a flat element between the two arms which is preferably energy absorbant. This element can be a sheet metal element formed in one piece with at least one of the two half-shells. The seat user thus experiences support even between the two arms, thereby preventing the arms from being able to exert a clamping effect on the upper body of the seat user.

If at least one shoulder belt of a safety belt system is to engage the upholstery support, it is more advantageous to provide the joining area with an extension which extends upwardly at an angle, than to provide the force introduction point directly in the joining area, because the material expense and thereby the weight increase from such an extension is significantly smaller than a corresponding expansion of the joining area. In addition, by means of the embodiment according to the invention of the upholstery support in the joining area, the forces introduced off-center through the extension are distributed approximately equally between the two arms, and the addition of the extension therefore does not require additional reinforcement of the arms. A design of the extension in which the outer lateral boundary surface of the extension is curved opposite the outer lateral boundary surface of the arm lying on the same side of the upholstery support and both surfaces merge smoothly, provides a particularly favorable force distribution.

If two extensions are formed on the joining area, which is particularly effective when a head rest is to be connected with the upholstery support, it is advantageous to form the two extensions as identical mirror images to the central longitudinal plane of the joining area and so as to be curved in the sense of a reduction in width of the front side toward the free end.

With the foregoing and other objects, advantages and features of the invention that will become hereinafter apparent, the nature of the invention may be more clearly understood by reference to the following detailed description of the invention, the appended claims and to the several views illustrated in the attached drawings.

BRIEF DESCRIPTION OF THE DRAWINGS

FIG. 1 is a top view of the front side of a first exemplary embodiment in accordance with the invention, FIG. 2 is a top view according to FIG. 1 of the second exemplary embodiment, FIG. 3 is a side view of the second exemplary embodiment, FIG. 4 is a section according to the line IV—IV in FIG. 2, FIG. 5 is a section according to the line V—V in FIG. 2, FIG. 6 is a section according to the line VI—VI in FIG. 2, FIG. 7 is an enlarged section according to the line VII—VII in FIG. 2, FIG. 8 is an enlarged section according to the line VIII—VIII in FIG. 2.

DETAILED DESCRIPTION OF THE PREFERRED EMBODIMENTS OF THE INVENTION

Referring now in detail to the drawings an upholstery support for a heavy load-bearing back rest of a motor vehicle seat, as shown in FIG. 1, has a V-like shape, whereby the two arms 1 extend downwardly from the shoulder-high joining area 2 to respective hinge fittings (not shown), whidh connect the back rest with the seat frame. At their upper ends the arms 1 merge into the joining area 2 and enclose an angle of about 75 degrees. Toward the lower, free ends of the arms 1, this angle decreases until it approaches zero. Accordingly, in this area the arms 1 run parallel to each other, so that overall, the arms 1 are curved.

The upholstery support is formed from two half-shells made of sheet steel and are provided with an outwardly bent flange along their edges. However, sheet aluminum or plastic, for example, could also be used instead of sheet steel. The flange 3 visible in FIG. 1 on the front half-shell 4 lies against a correspondingly formed flange on the rear half-shell and is connected at the attachment points 5 with the flange of the rear half-shell.

With respect to further details, reference is made to the description relating to the second exemplary embodiment, whidh essentially differs from the first exemplary embodiment only in that in the second embodiment, two extensions 106, which extend at an angle laterally and upward, are formed on the joining area, and these extensions 106, like the other elements of the upholstery support, are formed from a front half-shell 104 and a rear half-shell 107, both of which are formed from sheet steel. As shown in FIG. 2, the extensions 106, like the two arms 101, are arranged as mirror images relative to the longitudinal center plane of the upholstery support. The connection of the hollow box-like extensions to the joining area 102 and the respective arms 101 is accomplished in such a manner that the outer lateral boundary surface 108 is curved in the opposite direction from the outer boundary surface 109 of the adjacent arm 101 and the merging of the two boundary surfaces 108, 109 is accomplished without buckling. The other, upwardly directed outer boundary surface 110 of the extensions is bent in the opposite direction, whereby the width of both the front side and the rear side of the extensions decreases toward the free end. The transition of the two outer boundary surfaces 110 also is accomplished in the center of the upholstery support without buckling.

Aside from the extensions 106, the second exemplary embodiment differs from the first by two respective swages 111 in the two half-shells 104 and 107. The swages 111 extend out of the joining area 102 into both of the respective arms 101 and also into the adjoining extension 106. In addition, the swages are bent in the same manner as the transition of the outer boundary surfaces 108 into the outer boundary surface 109 and have their greatest width in the joining area 102.

The front side 112 of the two mirror-image identical arms 101 is provided with a buckle line 113, which runs from the inside near the lower end, with a curvature similar to the curve of the arms, up to the outer boundary surface at the transition of the arm into the joining area 102. A second buckle line 114 joins there, whidh runs along an upwardly curved path to the upper end of the buckle line 113 of the other arm 101, whereby it remains in the center of the joining area 102 spaced from the upper boundary surface thereof. As shown in FIGS. 5 and 6, the front side 112 of the buckle line 113 runs out to the outer boundary surface 109 parallel to the separating plane 119 defining the outer flange 103. In contrast, the distance of the front side 112 from the separating surface decreases toward the inner boundary surface 115, while forming a curved surface which forms a portion of a support surface having a curved cross-sectional profile adapted to the human body. Accordingly, the distance of the front side of the joining area 102 from the separating plane 119 also decreases in the section extending downwardly from the second buckle line 114. and in such a manner that this section joins the curved sections of the front side 112 of the arms 101 without buckling and supplements the support surface. The section lying above the second buckle line 114 and the front side of the two extensions 106 lie parallel to the separating plane, which is also true for the corresponding sections of the rear side.

In the area where the arms 101 merge with the joining area 102, the arms 101 have a width measured in the lateral direction of the seat which is greater than their depth measured perpendicularly to the separating plane 119. The width decreases continuously and the depth increases continuously toward the lower end, in such a manner that the arms 101 form supports that are at least approximately equal in their resistance to bending against forces applied perpendicularly to the separating surface on the joining area 102 or on the extensions 106. As a result of the hollow box-like profile and the above-mentioned profile shaping, as well as the reinforcement from the buckle lines and the swaging, when the upholstery support is subjected to bending load, the compressively loaded surface does not buckle but rather, at most, is deformed in a controlled manner, and the tensilely loaded surface, while indeed absorbing energy, experiences a permanent extension. The upholstery support is therefore able to absorb extremely high forces, and can do so without significant deformation under an off-center application of force, such as the introduction of the applied force through one of the extensions 106.

As shown in the FIGS. 7 and 8, the flanges 103 are connected with each other in a compressive joining technique, according to which the two superimposed flanges 103 are provided with two adjacent, spaced cuts running in the longitudinal direction of the flanges, and the cross member 117 of one flange is pressed through the other flange, whereby the cross member 117 of the latter flange experiences a corresponding, permanent deformation and lies against the cross member 116.

A sheet element 118 shaped to correspond to the support surface is provided between the two arms 101, and adjoins the inner flange 103 of the two arms 101, and is formed in one piece with the half-shell 107. However, it would also be possible, for example, to provide the edge of the sheet metal 118 with cuts like the flange 103, in order to connect the sheet metal and the two flanges 103 together in the compressive joining tedhnique described above, or to produce a connection with the flanges 103 by spot welding.

As shown particularly in FIGS. 4 through 6, the two half-shells 104 and 107 are not formed as identical mirror-images of each other relative to the separating plane 119 defined by the outer separating seam. The deviating shape, which, as shown in FIG. 5, requires among other things that the inner separating seam does not define a plane, and results above all in the advantage of a human body-adapted profiling of the front side, thereby achieving a smaller structural depth of the back rest equipped with the upholstery support according to the invention. Outside of the buckle line 113 and above the second buckle line 114, however, the two half-shells are formed as identical mirror-images, as shown in FIGS. 3 through 6, which is the reason that the outer flanges define a planar separating surface, as shown most clearly in FIG. 3.

In place of the two extensions 106 it would also be possible, of course, to provide only one of these extensions, for example, because only one angular shoulder belt is used or the upholstery support is not provided for both the driver's seat and for the passenger seat. The joining area 102 would then be upwardly bounded by the lines 120 illustrated in FIG. 2 instead of the missing extension. In this case, the single swage 111 would have to end at a distance from the lines 120, as is indicated by the line 121.

The shape of the two half-shells requires a relatively large reduction in material in the area between the arms 101, at least if the sheet metal 118 is not formed in one piece with one of the half-shells. To avoid this reduction in material one or both of the half-shells can be comprised of two elements. The separation would then advantageously be provided in the longitudinal center plane. Therefore, in FIG. 2 this separation possibility is indicated by the separating line 122, along which the two halves overlap, in order to be able to connect them with each other separating line 122.

In those areas of the two half-shells 101 in which the danger of buckling exists, the hollow chamber can be filled with foam in order to prevent such a buckling. A different possibility for support would be to employ cross members. Of course, the hollow chamber can be filled with foam in addition to the cross members being used, and the chamber to be filled with foam can thereby be defined by such cross members.

In addition, the flange 103 can be divided into sections with cuts provided at distances from each other in the longitudinal direction, and the front or rear ends of such sections can be beveled. It is particularly advantageous to alternatingly bevel these sections front and rear, because then transverse (or shear) forces can also be absorbed. But even without the alternating bending, the beveled flange elements achieve an increased load carrying capacity of the connection between these two half-shells.

Although only preferred embodiments are specifically illustrated and described herein, it will be appreciated that many modifications and variations of the present invention are possible in light of the above teachings and within the purview of the appended claims without departing from the spirit and intended scope of the invention.

We claim:

1. An upholstery support for the back rest of a vehicle seat, particularly a motor vehicle seat, comprising two reinforced half-shells that are connected with each other at least along a portion of their edges, said half-shells forming hollow, box-like arms which separate from each other beginning in a hollow box in which said arms are joined and extend toward the free ends of the arms, wherein the free ends of the two arms form the lower end of the upholstery support with each of said arms having an inner boundary and an outer boundary, in which the inner boundaries of the two arms form a V-like shape that is open toward the lower end.

2. The upholstery support of claim 1 adapted to be upholstered, and having a front side which faces said upholstery and a rear side which faces away from said upholstery, said arms of said upholstery support having front sides which face said upholstery and rear sides which face away from said upholstery, said front side and rear side of said arms having a lateral direction defined by a plane parallel to the plane passing through the edges of the reinforced half-shells that are connected with each other, wherein the width of the front side toward the upholstery and the rear side of the two arms, measured in the lateral direction of the arms, decreases toward the free ends of the arms, and the depth of the arms, measured perpendicularly to the lateral direction of the arms, increases toward their free ends.

3. The upholstery support of claim 2, wherein the width and depth of the arms are selected such that the width decreases continuously and the width increases continuously toward the lower end of said arms, so that the arms form supports having equal resistance against bending as a result of a force applied to the joining area perpendicularly to the lateral direction of the arms.

4. The upholstery support of claim 2, wherein in the upper end area of the arms, the width of said arms is greater than the depth of said arms, and in the lower end areas the depth is greater than the width.

5. The upholstery support of claim 1, wherein the angle enclosed by the two arms becomes smaller toward the free ends of said arms.

6. The upholstery support of claim 1, wherein the front sides of both arms are provided with respective buckling lines extending from the free ends of said arms up to the hollow box in which said arms are joined and wherein from the hollow box in which said arms are joined out to the outer boundary of the front side there is a constant distance from a plane passing through the edges of the reinforced half-shells that are connected with each other and to the inner boundary there is a decreasing distance therefrom.

7. The upholstery support of claim 6, wherein the section of the front side of the arm lying between the buckling line and the inner boundary forms a portion of a support surface which is concave in the lateral direction of the upholstery support.

8. The upholstery support of claim 6, wherein the upper end of the buckling line of the arms ends in the area of the outer boundary of the upholstery support.

9. The upholstery support of claim 6, wherein a second buckling line joins the upper end of the buckling line of both arms, said second buckling line running in an upward curve in the front side of the hollow box in which said arms are joined and, in the section of the front side of the hollow box in which said arms are joined lying below the second buckling line, smoothly joins the two inwardly lying sections of the front side of the arms without buckling.

10. The upholstery support of claim 1, wherein the outer separating lines of both arms lie in a common plane.

11. The upholstery support of claim 1, wherein the hollow box in which said arms are joined is arranged at shoulder height.

12. The upholstery support of claim 1, wherein a flat, energy absorbing element is arranged between the two arms.

13. The upholstery support of claim 12, wherein the energy absorbing element is a sheet metal element.

14. The upholstery support of claim 12, wherein the energy absorbing element is formed in one piece with at least one of the two half-shells.

15. The upholstery support of claim 1, wherein at least one hollow box-like extension is formed on the hollow box in which said arms are joined and extends upwardly therefrom at an angle disposed with respect to the horizontal plane.

16. The upholstery support of claim 15, in which said hollow box-like extension has an outer lateral boundary surface, said outer boundaries of said arms are curved, and wherein the outer lateral boundary surface of the extension is curved opposite to the outer boundary of the arm lying on the same side of the upholstery support and both said outer lateral boundary surface of said extension and said outer boundary of said arm lying on the same side of the upholstery support merge without buckling.

17. The upholstery support of claim 15, wherein two hollow box-like extensions are formed on the hollow box in which said arms are joined and the two extensions are formed as identical mirror-images of each other relative to the central longitudinal plane of the hollow box in which said arms are joined.

18. The upholstery support of claim 17, in which each of said hollow box-like extensions has an upper boundary surface and a front side facing said upholstery wherein the upper boundary surfaces of both extensions are curved in the sense of a reduction in width of the front side toward the free end, and both upper boundary surfaces merge together without buckling.

19. The upholstery support of claim 1, wherein at the interior of said support, particularly in the area subjected to a buckling load, at least one reinforcing element is arranged to support the half-shells against each other.

20. The upholstery support of claim 19, wherein the reinforcing element is an element formed of one of a foam filling and a cross member.

21. The upholstery support of claim 1, wherein the two half-shells are connected with each other along lateral, superimposed flanges and wherein the flanges are divided into sections by cross cuts, which sections are all bent at an angle with respect to said flanges, and form a pattern which is one of a pattern in which all the sections are bent forward, all the sections are bent backward, and all the sections alternate between being bent forward and backward.

22. An upholstery support for the back rest of a vehicle seat, particularly a motor vehicle seat, comprising two reinforced half-shells that are connected with each other at least along a portion of their edges, said half-shells forming hollow, box-like arms which separate from each other beginning in a hollow box in which said arms are joined and extend toward the free ends of the arms, wherein the free ends of the two arms form the lower end of the upholstery support with each of said arms having an inner boundary and an outer boundary, in which the inner boundaries of the two arms form a V-like shape that is open toward the lower end; and,
    said arms having an upper end and a lower end,
        wherein at the upper end of the arms, the width of said arms is greater than the depth of said arms, and at the lower end of the arms the depth is greater than the width.

* * * * *